United States Patent [19]

Li

[11] Patent Number: 5,005,896
[45] Date of Patent: Apr. 9, 1991

[54] RETRACTABLE TRUCK CANOPY FRAME

[76] Inventor: Cheng-Chia Li, No. 391, Tung Men Road, Tainan, Taiwan

[21] Appl. No.: 468,146

[22] Filed: Jan. 22, 1990

[51] Int. Cl.$^5$ ............................................. B62D 25/06
[52] U.S. Cl. .................................. 296/100; 296/105; 135/103
[58] Field of Search ................. 296/100, 105; 135/103

[56] References Cited

U.S. PATENT DOCUMENTS

| | | | |
|---|---|---|---|
| 3,064,667 | 11/1962 | Marino | 296/105 |
| 3,874,721 | 4/1975 | Tuggle | 296/105 |
| 4,721,336 | 1/1988 | Jones | 296/105 |

Primary Examiner—Robert R. Song
Attorney, Agent, or Firm—Bacon & Thomas

[57] ABSTRACT

This invention relates to a retractable truck canopy frame and in particular to one utilizing: two rails, fixed at the sides of a truck bed; several sliding elements connected with the rails; several main frames having each end connected with one sliding element; and several linking rods crossly connected with every two main frames along the two sides of the bed. By pushing or pulling the main frames along the rails, the truck canopy may be either retracted or extended as desired.

1 Claim, 6 Drawing Sheets

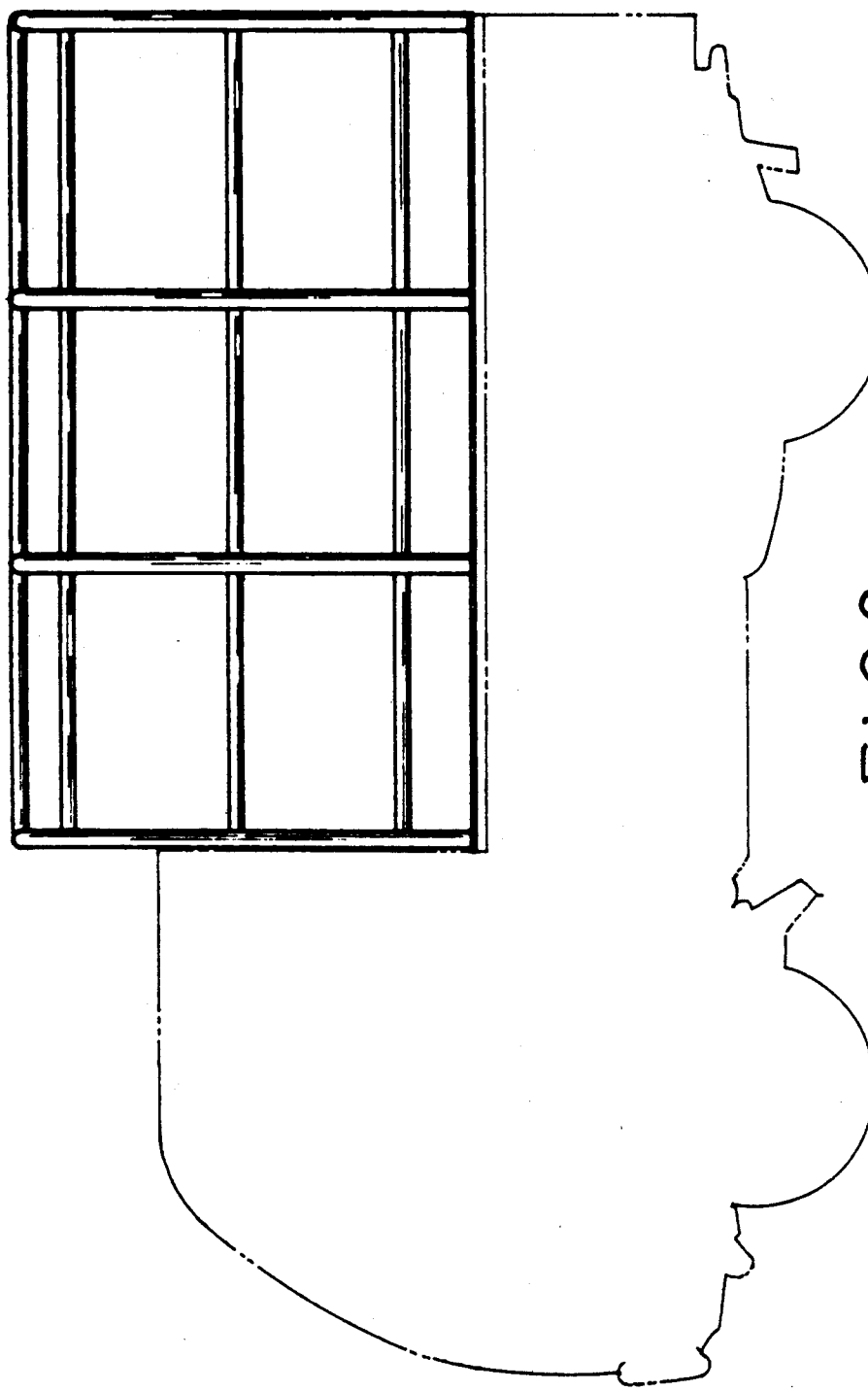

RETRACTABLE TRUCK CANOPY FRAME

BACKGROUND OF THE INVENTION

Trucks have long been used by businessmen to deliver goods and also by people to move their household possessions. The prior canopies used on trucks are generally of two types, one is a fixed metal canopy and the other is an open truck. The benefit of the fixed metal canopy is to prevent the sun from directly shining, and rain directly falling on goods, but the loading and unloading is very inconvenient because of the limited space. The goods to be delivered are limited by their size so as not to protrude over the canopy.

The open truck has the benefit of easy loading and unloading goods but, on the other hand, the goods will be exposed to sun and rain. Therefore, an assembled canopy has been adapted for the open truck, which maybe assembled or disassembled as a whole. When assembled, it possesses both the same benefits and the defects like the fixed metal canopy, and it has the same benefits and defects like the open truck when disassembled.

The inventor, in view of this, invented this invention which possesses the merits of both the fixed metal canopy and the open truck.

SUMMARY OF THE INVENTION

It is the primary object of the present invention to provide a retractable truck canopy frame which may either be retracted in whole or in part, depending on the need.

It is another object of the present invention to provide a retractable truck canopy frame which is not limited by weather in operation.

It is still an object of the present invention to provide a retractable truck canopy frame which provides more cargo space.

It is still another object of the present invention to provide a retractable truck canopy frame which is easy to operate.

It is a further object of the present invention to provide a retractable truck canopy frame which is inexpensive to produce.

BRIEF DESCRIPTION OF THE DRAWINGS

FIG. 6 is a prior art device shown mounted on a truck.

DETAILED DESCRIPTION OF THE PREFERRED EMBODIMENT

Figure 1:
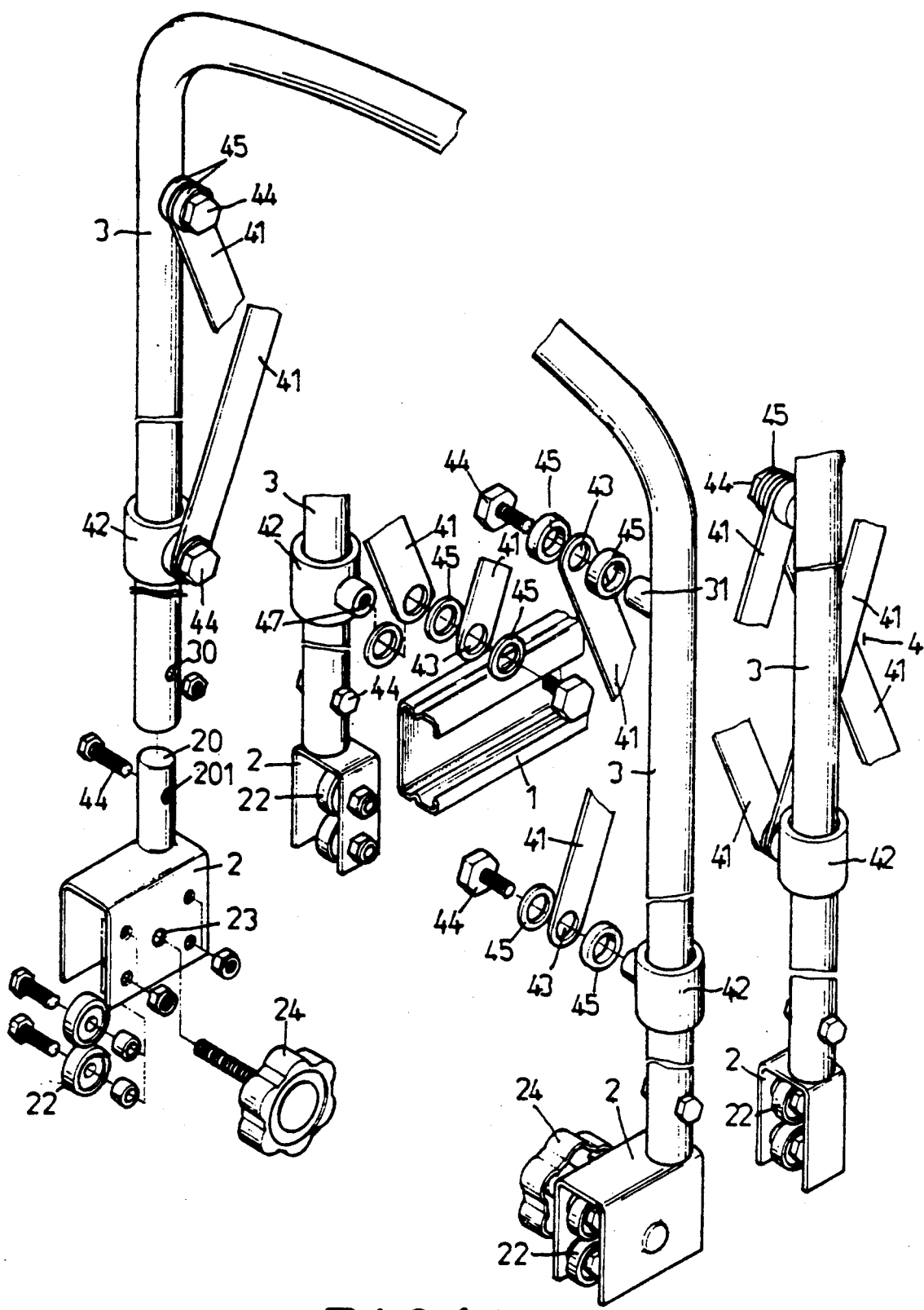
FIG. 1 is an exploded perspective view, partially fragmented, of the present invention.
Figure 2:
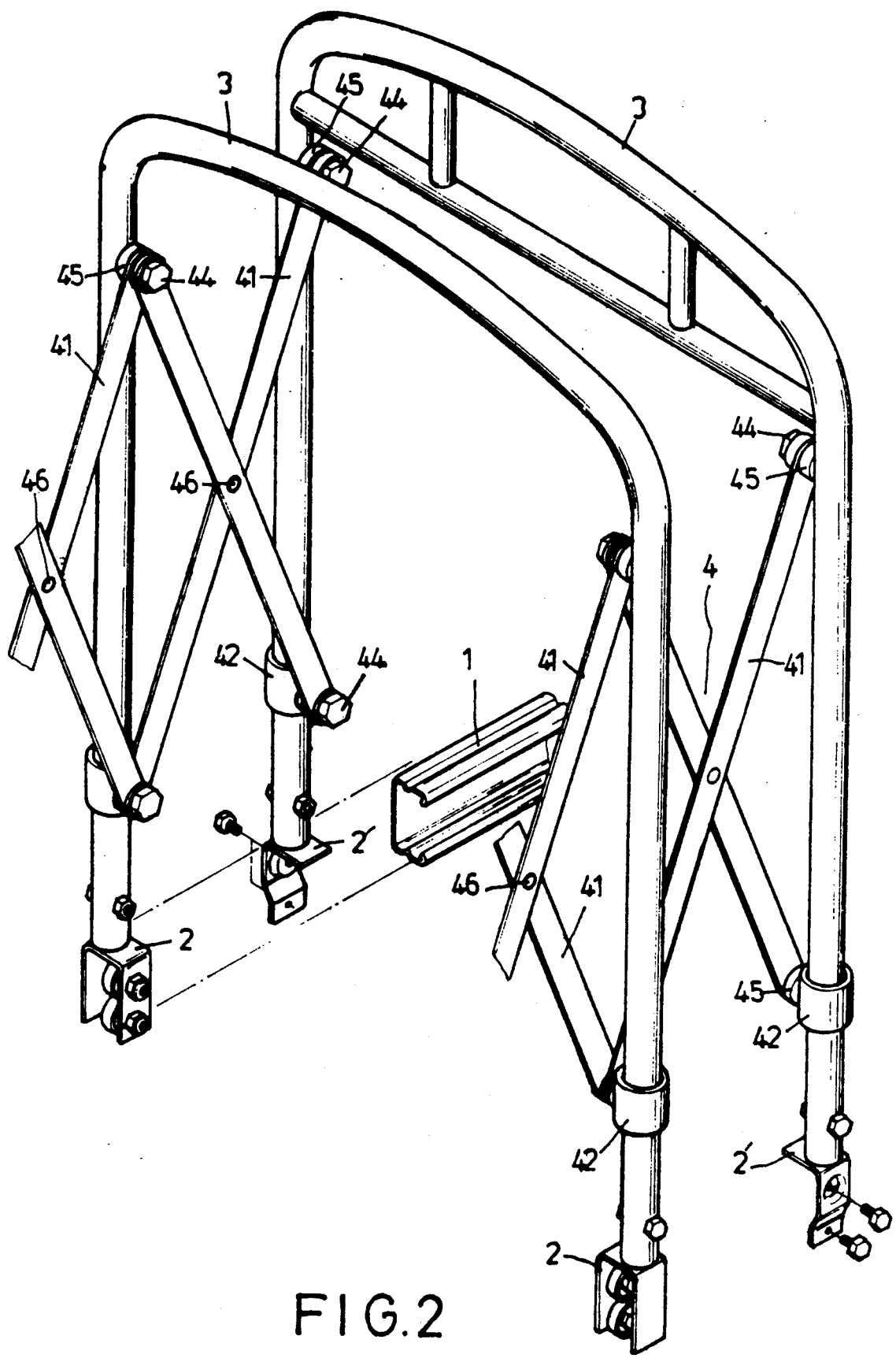
FIG. 2 is a perspective view of the present invention showing the relationship between a rail and a sliding element.
Figure 3:
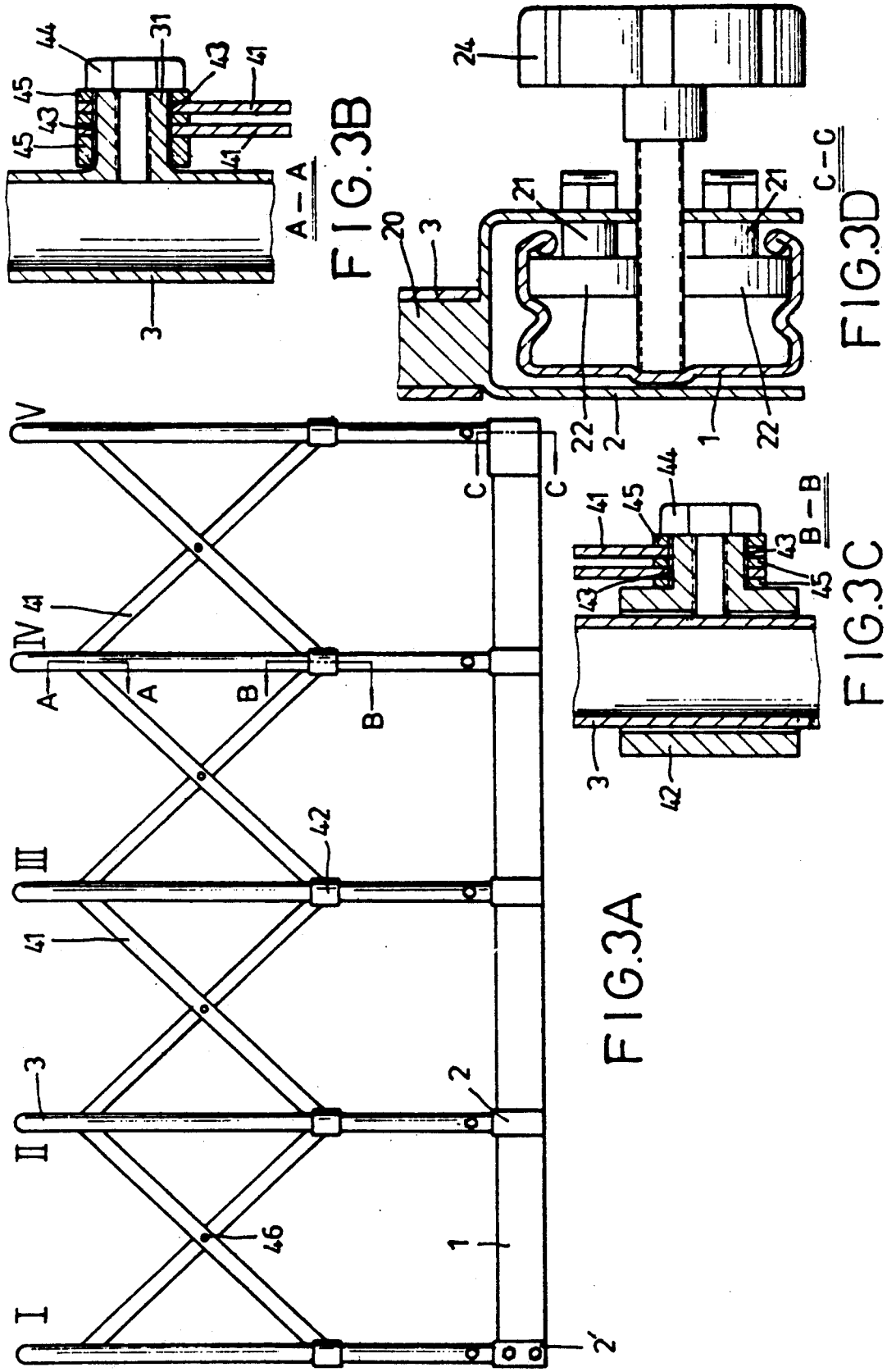
FIG. 3A is a side view of the present invention.
FIG. 3B is an enlarged sectional view of A—A of FIG. 3A.
FIG. 3C is an another sectional view of B—B of FIG. 3A.
FIG. 3D is still another sectional view of C—C of FIG. 3A.
Figure 4:
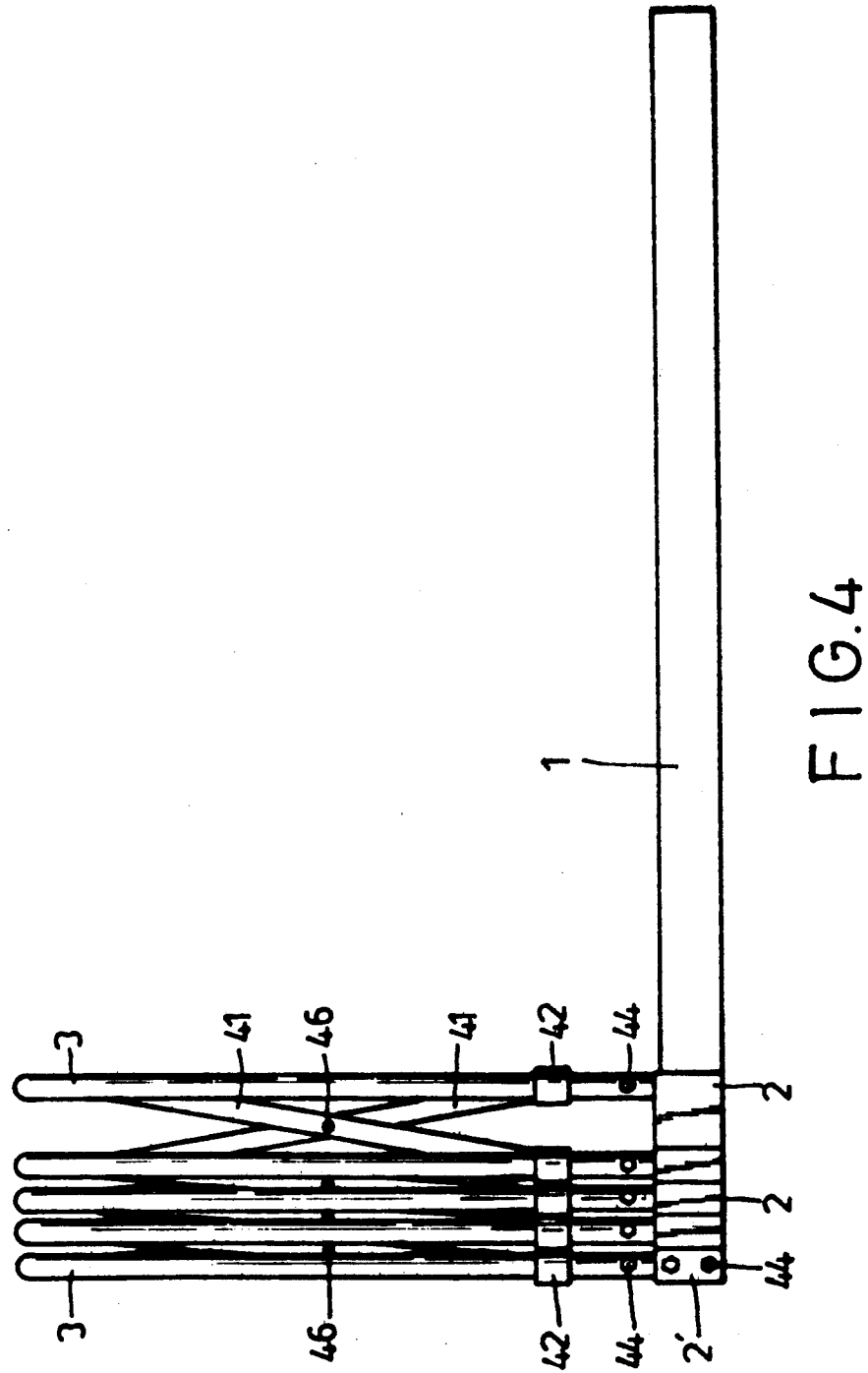
FIG. 4 is a view of 3A showing the invention in a folded position.
Figure 5:
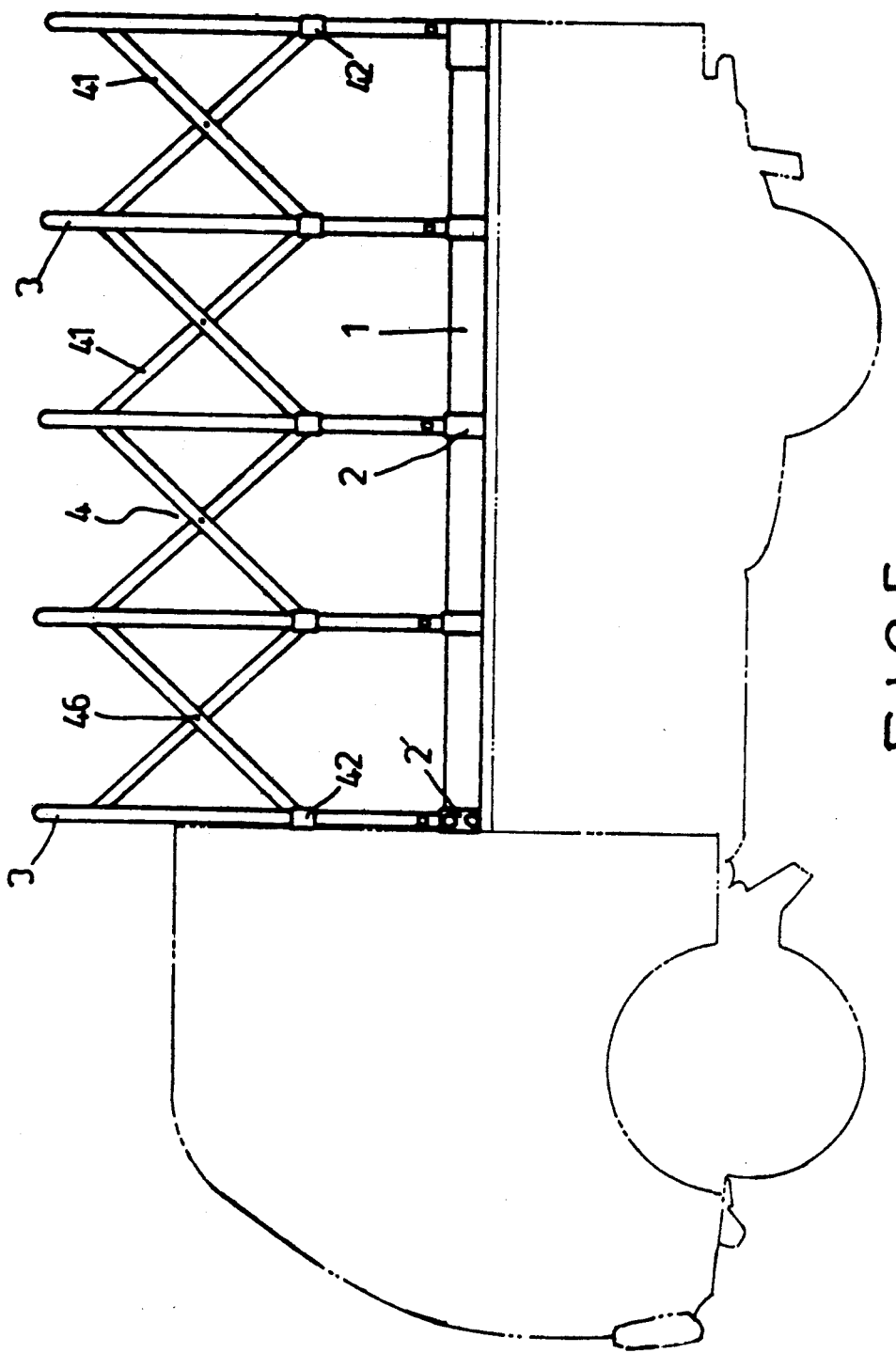
FIG. 5 is the present invention shown mounted on a truck.

Reference is now made to the drawings and in particular to FIG. 1 and FIG. 2 thereof, wherein the present invention comprises two rails 1 having the same length as the truck bed and being installed on two sides of the bed. There are provided several sliding elements 2 each of a U-shaped configuration and having an extending post 20 on top, two rollers 22 installed therein for engaging the inner channels of the two rails 1. Two rearmost side sliding elements 21 have an adjustable screw 24 at the center to secure the two endmost rollers 22 on the rails 1. Each of the main frames 3 is made from one round stock of U-shaped configuration with two ends of each being provied with a hole 30 to secure the main frame 3 with a bolt 44 through a screw hole 201 of the post 20 of the sliding element 2, and each further has a protuberant portion 31 which has a screw hole in its center at its upper portion and a slidable fixture 42 at its lower portion. The linking set 4 are all made from pairs of long flat rods 41. Each rod 41 has holes 43 at its upper and lower ends. The upper hole 43 is connected with the protuberant portion 31 of the main frame 3 through washers 45 by a bolt 44 while the lower hole 43 is connected with the slidable fixture 42. With reference to FIG. 3A, if the truck has five main frames 3 installed on its bed, from main frame I through main frame V, the upper hole 43 is connected with the protuberant portion 31 of the main frame I and the lower hole 43 of the same is connected with the slidable fixture 42 of the main frame II. The upper protrusion 31 on the main frame II is connected with two rods 41 on their upper holes 43, shown in FIG. 3B, and one of the lower holes 43 of which is connected with slidable fixture 42 of the main frame I, and the other rod 41 is connected to the main frame III, shown in FIG. 3C and the intersection of two rods 41 have been fixed with a rivet 46. The sliding element 2' connected with the first main frame, according to this example, is fixed on the rail 1 while the rest of sliding elements 2 connected with the main frame II, III and IV remain free in the rail 1. The last rearmost sliding element 2 connected with the main frame V has an adjustable screw 24, shown in FIG. 3D, which is used to tighten or loosen the rearmost sliding element 2 to open or retract the canopy as required. When the adjustable screw 24 of the sliding element 2 is loosened, the main frame 3 may be pushed toward the front end and, because the slidable fixture 42 is slidable up and down along the main frame 3, the canopy can be retracted, as shown in FIG. 4 or pulled backward to open the canopy, as shown in FIG. 5. Since the forward end of the sliding element 2 is fixed at the rail 1, no matter how hard the last main frame 3 is pulled, the first main frame 3 will stay fixed and will not be pulled away. When the canopy has reached the desired position, the adjustable screw 2A is turned inwardly to tighten the canopy at this position.

I claim:

1. A retractable truck canopy frame for a truck body, comprising:
    (a) a pair of rails adapted to be installed on opposite sides of a truck body, each rail having an inwardly opening, generally "C" shaped cross-sectional configuration;
    (b) a plurality of sliding elements, each sliding element having a mounting post extending generally upwardly therefrom and a pair of vertically spaced rollers slidably receivable in one of the respective rails;

(c) a plurality of main frames, each main frame having an inverted generally "U" shaped configuration with each lower end of each main frame fixedly connected to the mounting post of a sliding element;

(d) a plurality of rods, each rod having one end pivotally connected to a main frame and an opposite end slidably attached to an adjacent main frame;

(e) means to fixedly attach the sliding elements associated with a frontmost main frame to the associated rail; and, (f) means to releasably fix the sliding elements associated with a rearmost main frame to the associated rail.

* * * * *